United States Patent
Mori et al.

(10) Patent No.: US 8,326,808 B2
(45) Date of Patent: Dec. 4, 2012

(54) INFORMATION PROCESSING APPARATUS, AND INFORMATION PROCESSING METHOD, PROGRAM, AND RECORDING MEDIUM

(75) Inventors: Shigeko Mori, Yamato (JP); Toshikazu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/727,297

(22) Filed: Mar. 19, 2010

(65) Prior Publication Data

US 2010/0274771 A1  Oct. 28, 2010

(30) Foreign Application Priority Data

Apr. 24, 2009  (JP) ................. 2009-106589

(51) Int. Cl.
*G06F 17/30* (2006.01)
(52) U.S. Cl. ...................................................... 707/690
(58) Field of Classification Search .................. 707/690
See application file for complete search history.

(56) References Cited

U.S. PATENT DOCUMENTS

| | | |
|---|---|---|
| 2007/0043775 A1 | 2/2007 | Mori |
| 2007/0106703 A1 | 5/2007 | Shiomi |
| 2008/0162585 A1 * | 7/2008 | Takahashi ................. 707/200 |

FOREIGN PATENT DOCUMENTS

| | | |
|---|---|---|
| JP | 2006139619 | 6/2006 |
| JP | 3884049 | 2/2007 |
| JP | 3894335 | 3/2007 |
| JP | 2008165474 | 7/2008 |

OTHER PUBLICATIONS

"IMS High Performance Pointer Checker for z/OS, V2R1, User's Guide vol. 1", Apr. 2, 2006, Version 2, Release 1, Publication No. SC18-7257-00, USA.

* cited by examiner

*Primary Examiner* — Rehana Perveen
*Assistant Examiner* — Alexander Khong
(74) *Attorney, Agent, or Firm* — North Shore Patents, P.C.; Michele Liu Baillie

(57) ABSTRACT

A method of verifying the consistency in a hierarchical database includes: generating a pointer record by acquiring a reference point stored in the hierarchical database and associating a first reference point identification value determined from a storage location of the reference point with pointer information retained at the reference point; generating a segment record by acquiring a segment stored in the hierarchical database and associating verification data with a retention address of the acquired segment, the verification data giving a second reference point identification value in connection with the calculation module, the calculation module calculating, for a segment in the hierarchical database, a reference point identification value used to identify a reference point which points to the segment; and verifying the consistency of a chain formed in the hierarchical database from the reference point to the segment by comparing the segment record with the pointer record.

12 Claims, 12 Drawing Sheets

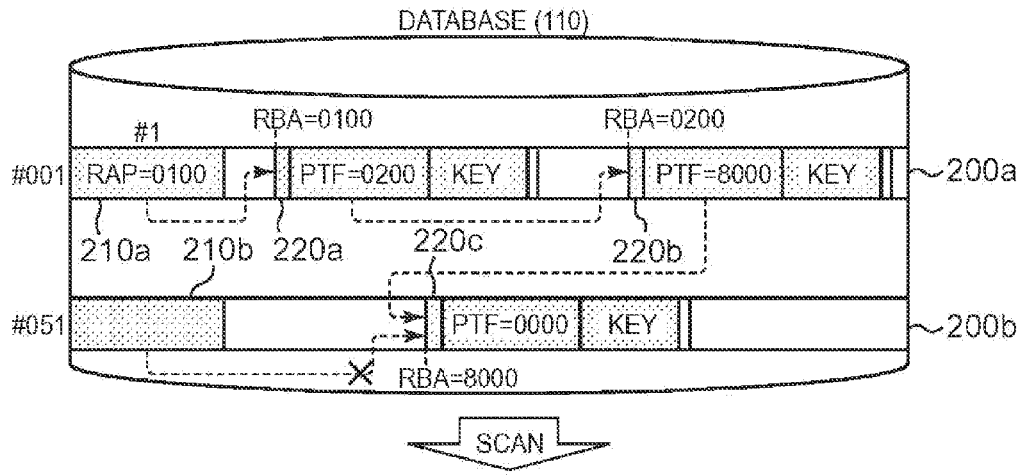
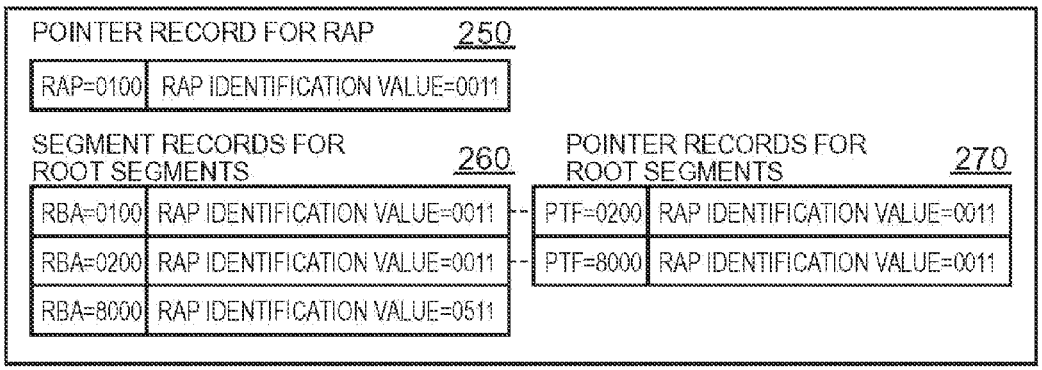
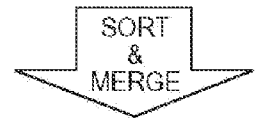
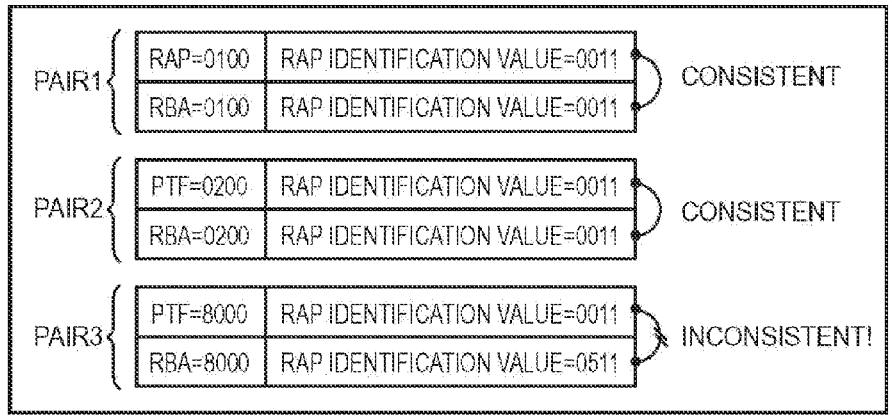
FIG. 7

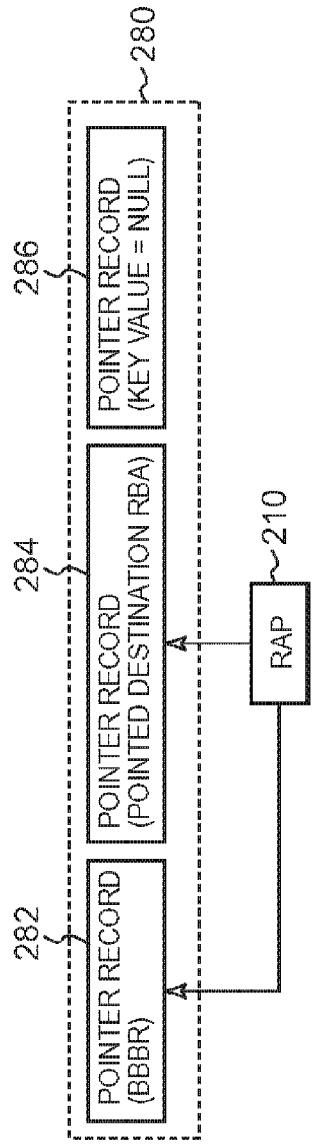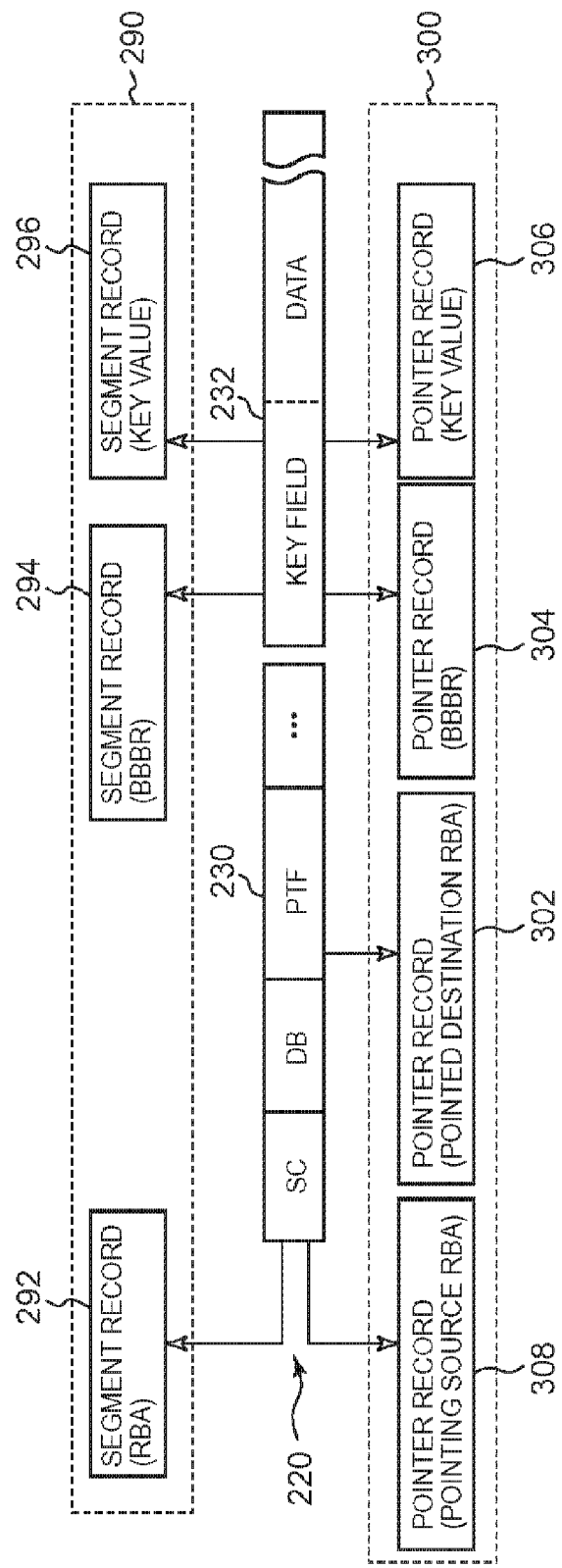

INFORMATION PROCESSING APPARATUS, AND INFORMATION PROCESSING METHOD, PROGRAM, AND RECORDING MEDIUM

CROSS-REFERENCE TO RELATED APPLICATIONS

The present application claims priority to Japanese Patent Application No. 2009-106589, filed on Apr. 24, 2009.

FIELD OF THE INVENTION

The present invention relates to a process of verifying the consistency related to a database, and more particularly to an information processing apparatus, and an information processing method, program, and recording medium for performing a process of verifying the consistency in a hierarchical database.

BACKGROUND OF THE INVENTION

Hierarchical database systems require few resources, operate at high speed, and allow accurate estimation of the response time, and thus, they are suitably used for applications requiring high reliability and availability, fast processing speed, and large capacity. The hierarchical database system (for example, IBM® IMS™ DL/I) is configured to manage data elements in the form of a tree structure. In the hierarchical database, a minimum data unit is called a segment occurrence (hereinafter, simply referred to as a "segment"), and the segment located at the top of the tree structure is called a root segment. The root segment has one or more dependent segments, and the dependent segment may also have one or more dependent segments. Such a set of segments in the form of a tree with the root segment at the top constitutes the hierarchical database.

The hierarchical databases may be classified primarily into two types, a sequential access type and a direct access type, in accordance with the technique used to maintain the tree structure of the segments in the database. In the sequential access type hierarchical database, the tree structure of the segments is maintained by storing the segments in physically neighboring storage locations. On the other hand, in the direct access type hierarchical database, pointers provided in the respective segments point to other segments to thereby maintain the tree structure of the segments in the database.

In the direct access type hierarchical database, the segments each include a prefix portion in which a pointer pointing to another segment related to that segment is stored, and a data portion in which at least one data element constituting data to be processed by an application program or the like is stored. More specifically, for the pointer in the prefix portion, a relative byte address (RBA) value indicating a retention address of the related segment is used. To access a certain segment, the pointers may be followed sequentially from the root segment.

The hierarchical database includes a large number of pointers as described above, and it is indispensable to maintain the consistency among the pointers. However, an inconsistency may occur among the pointers due to an operation mistake in the database, defects in software or hardware, and others. Taking this into consideration, in the hierarchical database, a pointer checker program is executed periodically so as to verify the consistency of the pointers.

One example of such a pointer checker program is IBM® IMST™ High Performance Pointer Checker. This pointer checker program executes a process of verifying the consistency of the pointers, independently of the database management system (hereinafter, referred to as "DBMS") (see "User's Guide" referenced below). To execute the process of verifying the consistency of the pointers, the pointers within the database are not read by tracing the chain. Rather, the data on a disk is read and scanned sequentially from the beginning, to extract the retention addresses of all the segments and also extract the pointer values which point to the segments. These two types of values are then compared to detect any inconsistency of the pointer values.

BRIEF SUMMARY OF THE INVENTION

The use of the conventional pointer checker program, as described in "IMS High Performance Pointer Checker for z/OS, V2R1, User's Guide Vol. 1", Apr. 3, 2006, Internet, URL; http://publib.boulder.ibm.com/cgi-bin/bookmgr/BOOKS/fabp1b10/CCONTENTS, (hereinafter "User's Guide"), enables verification of the consistency of the pointers in a tree structure having a root segment at the top. However, it has been pointed out that there are cases, as will be described below, where the above-described conventional pointer checker program cannot verify whether a pointer for chaining the root segment at the top of the tree structure to another segment in the database has been correctly related thereto.

FIG. 12 is a schematic diagram showing a series of root segments chained in a hierarchical database. As shown in FIG. 12, in a hierarchical database 500, each root segment is recorded over a plurality of blocks 510a to 510e. Further, as shown in FIG. 12, in each block 510, at least one root anchor point (RAP) 520 is generated, each pointing to a specific root segment.

In the case where a randomizing module is used to access a root segment, the RAP to which the root segment is chained is determined by the randomizing module. The RAP is identified by the relative block number of a block generated and the RAP number indicating the ordinal number within the block. When a root segment is stored in a database, the randomizing module determines the RAP to which the root segment is chained, in accordance with the key value stored in a key field of the root segment. Then, the RBA value of the root segment is stored in the determined RAP, and the update is fixed by sync-point processing (SYNC). On the other hand, in order to refer to a root segment having a desired key value, the key value is passed to the randomizing module, the block having the relative block number specified by the key value is read, and the chain whose reference point corresponds to the RAP specified by the RAP number within the block is traced so as to refer to the target root segment.

The randomizing module converts the key value to the relative block number and the RAP number, in accordance with a predetermined mathematical algorithm such as a hash function. Thus, there is a case where a plurality of root segments are chained from a single RAP, as shown in FIG. 12. Such a chain is called a "synonym chain".

In the example shown in FIG. 12, a synonym chain has been established from a RAP 520, through a root segment A 530 and a root segment B 540, to a root segment C 550. In this case, the RAP 520 contains a retention address (RBA value) of the root segment A which was generated firstly, and the retention address of the next root segment B 540 is contained in a physical twin forward (PTF) pointer 536 which is provided in a pointer field 532a in a prefix portion 532 of the root segment A 530. Similarly, the retention address of the root segment C 550 is contained in a PTF pointer 546 of the root segment B 540. Furthermore, the synonym chain is formed in correspondence with the order of the key values of the root segments.

As described above, a root segment may be accessed by tracing the chain from a specific RAP as the reference point. This means that the root segment needs to be chained from the RAP having a correct relative block number and a correct RAP number. When a root segment is stored, however, a program error may occur in the DBMS or in a database generation utility or an error may occur in the randomizing module, in which case the root segment may be chained from an incorrect RAP. Furthermore, although the randomizing module may be customized by a user in accordance with a specific database, a wrong randomizing module may be used temporarily due to an operation mistake or the like.

If a root segment is chained from a wrong RAP, it will not be possible to reach the erroneously chained root segment. Moreover, there may be a restriction that a synonym chain should be formed in accordance with the order of key values of the root segments.

The conventional pointer checker program disclosed in the User's Guide referenced above is not able to verify whether the root segment is chained from a correct RAP within a hierarchical database. Moreover, it cannot address the restriction about the order of the key values of the root segments in the synonym chain. Accordingly, there has been a demand for development of a technique which enables verification of the consistency in such a pointer chain from a RAP as a reference point to a root segment.

The present invention has been accomplished in view of the foregoing problems of the conventional techniques, and the present invention provides an information processing apparatus and an information processing method, program, and recording medium which can efficiently verify the consistency of a chain from a reference point to a segment, which is formed in a hierarchical database.

To achieve the above, in the present invention, a reference point stored in a hierarchical database is acquired, and a pointer record is generated by associating a first reference point identification value determined from a storage location of the reference point with pointer information retained at the reference point. Further, a segment stored in the hierarchical database is acquired, and a segment record is generated by associating verification data with a retention address of the segment, where the verification data gives a second reference point identification value used to identify the reference point which is supposed to point to the acquired segment (i.e., a reference point identification value for the proper reference point to which the segment belongs). The verification data gives the second reference point identification value in connection with a calculation unit such as the above-described randomizing module. The generated segment record and the generated pointer record are compared with each other to verify the consistency of a chain formed in the hierarchical database from the reference point to the segment.

According to the above configuration of the present invention, the first reference point identification value obtained from the storage location and the verification data which gives the second reference point identification value in connection with the calculation unit such as the randomizing module are contained in the work records to be compared. This enables determination as to whether a prescribed segment is chained from a proper reference point.

In the present invention, a second pointer record may also be generated by associating the verification data, which gives the second reference point identification value in connection with the calculation unit such as the randomizing module, with pointer information which is retained in the acquired segment and points to a twin segment thereof. In this case, it can be determined that the chain is inconsistent in the case where a mismatch is found between the reference point identification values for the segment record and the pointer record whose retention address and pointer information coincide with each other.

According to the above configuration, the reference point identification values are contained in both the pointer record and the segment record generated for a segment. This enables verification of the consistency of the reference point identification values between the twin segments chained by a pointer, and accordingly, enables verification of the consistency through the entire chain from the reference point to the segment.

Further, in the present invention, a key value retained in the acquired segment may be contained in the segment record and the second pointer record. In this case, it can be determined that the chain is inconsistent in the case where a contradiction in magnitude relation between the key values is found for the segment record and the pointer record whose retention address and pointer information coincide with each other. Here, the contradiction in magnitude relation between the key values is found when the key value of the segment record is smaller than the key value of the pointer record in the case where the key values should appear in ascending order from the pointing side (source) to the pointed side (destination), or when the key value of the segment record is greater than the key value of the pointer record in the case where the key values should appear in descending order.

According to the above configuration, the key value is contained in both the pointer record and the segment record generated for a segment. This enables verification of the consistency of the key values in a chain from a segment to a twin segment thereof, and accordingly, enables verification of the perfectibility of the chain formed in the hierarchical database from the reference point to the segment.

Furthermore, in the present invention, the key value retained in the acquired segment may be provided to the calculation unit to call and cause the calculation unit to calculate the second reference point identification value, and the segment record and the second pointer record may be generated by attaching thereto the calculated second reference point identification value itself as the verification data. Alternatively, the segment record and the second pointer record may be generated by attaching thereto the key value retained in the acquired segment as the verification data. In this case, prior to comparison of the records, the key value contained in the segment record or the second pointer record may be provided to the calculation unit to call and cause the calculation unit to calculate the second reference point identification value, to thereby verify the consistency. In the case where the key value retained in the acquired segment is contained in the segment record and the second pointer record, the reference point identification value may be derived from the key value, so that the key value can be used as the verification data. According to this configuration, it is unnecessary to call the calculation unit during the process of reading the database, so that the total time required for the database reading process can be reduced, and the size of each work record can also be decreased.

Still further, in the present invention, the segment records and the pointer records may be sorted and matched against each other, to detect an inconsistency in a chain. According to this configuration, the consistency of the chain from the reference point to the segment can be verified using the logic for verifying the consistency of other pointer values related to the hierarchical database. This also has the advantage that there is no need of an extra logic.

Furthermore, in the present invention, as the reference point identification value, a value derived from an identification value for identifying a unit storage area in which the reference point is stored and an identification value for identifying the order of precedence of the reference point in the unit storage area may be used. Still further, in the present invention, the segment constituting the chain to be verified may be a root segment, and the reference point may be a root anchor point. Moreover, in the present invention, the process of verifying the consistency of the chain formed in the hierarchical database from the reference point to the segment may be implemented on an information processing apparatus capable of accessing a hierarchical database, which is different from the database management system. Alternatively, a database management system for managing the hierarchical database may also be provided on an information processing apparatus which implements the process of verifying the consistency of the chain formed in the hierarchical database from the reference point to the segment. Moreover, according to the present invention, an information processing method, program, and recording medium having the above-described features are provided.

BRIEF DESCRIPTION OF THE SEVERAL VIEWS OF THE FIGURES

FIG. 7 shows a flow of the consistency verification process of the embodiment of the present invention, together with a data structure being used;

FIGS. 9A and 9B show a process of generating work records in the other process of verifying the consistency of a chain, together with a data structure being used;

DETAILED DESCRIPTION OF THE INVENTION

The present invention will now be described with reference to a specific embodiment, although the present invention is not restricted thereto. In the following, an embodiment of the present invention will be described by giving as an example a database management apparatus having a function of verifying the consistency of pointers within a hierarchical database.

Figure 1:
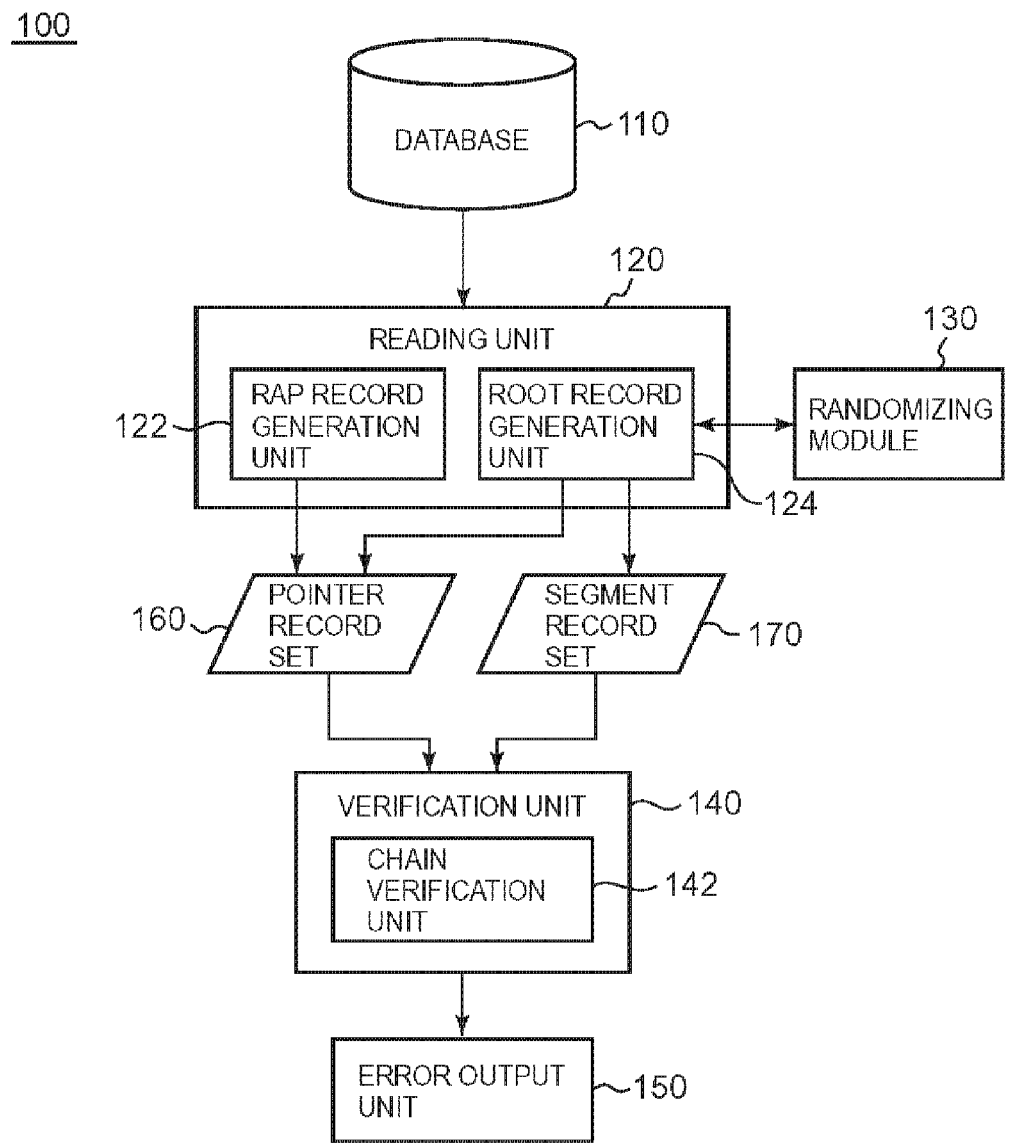
FIG. 1 shows functional blocks which are implemented on a database management apparatus according to an embodiment of the present invention.

FIG. 1 shows functional blocks which are implemented on a database management apparatus 100 according to an embodiment of the present invention. The database management apparatus 100 is generally a large-scale general-purpose computer such as a mainframe computer. The database management apparatus 100 manages a database 110, processes requests to access data in the database 110, and also has a function of verifying the consistency of various pointers in the database 110. The functional units within the database management apparatus 100 shown in FIG. 1, which will be described later in detail, are implemented on the database management apparatus 100 as a program is deployed on a memory and the program is executed to control the operations of the hardware resources.

The database 110 of the present embodiment is configured in accordance with a so-called hierarchical data model in which data is expressed in a tree structure. The database 110 is managed by a database management system (DBMS) such as IMS™ which is implemented by the database management apparatus 100. The storage area for the database 110 is provided by a disk device or other storage device connected to the database management apparatus 100 via an I/O interface.

The record stored in the database 110 is made up of a group of data pieces called segment occurrences (hereinafter, simply referred to as "segments"). In the database 110 of the present embodiment, each segment is configured to include a pointer value, which points to another related segment, and a data element. In the database 110, the segments point to one another with the pointers, whereby a tree structure of the records is maintained.

Figure 2:
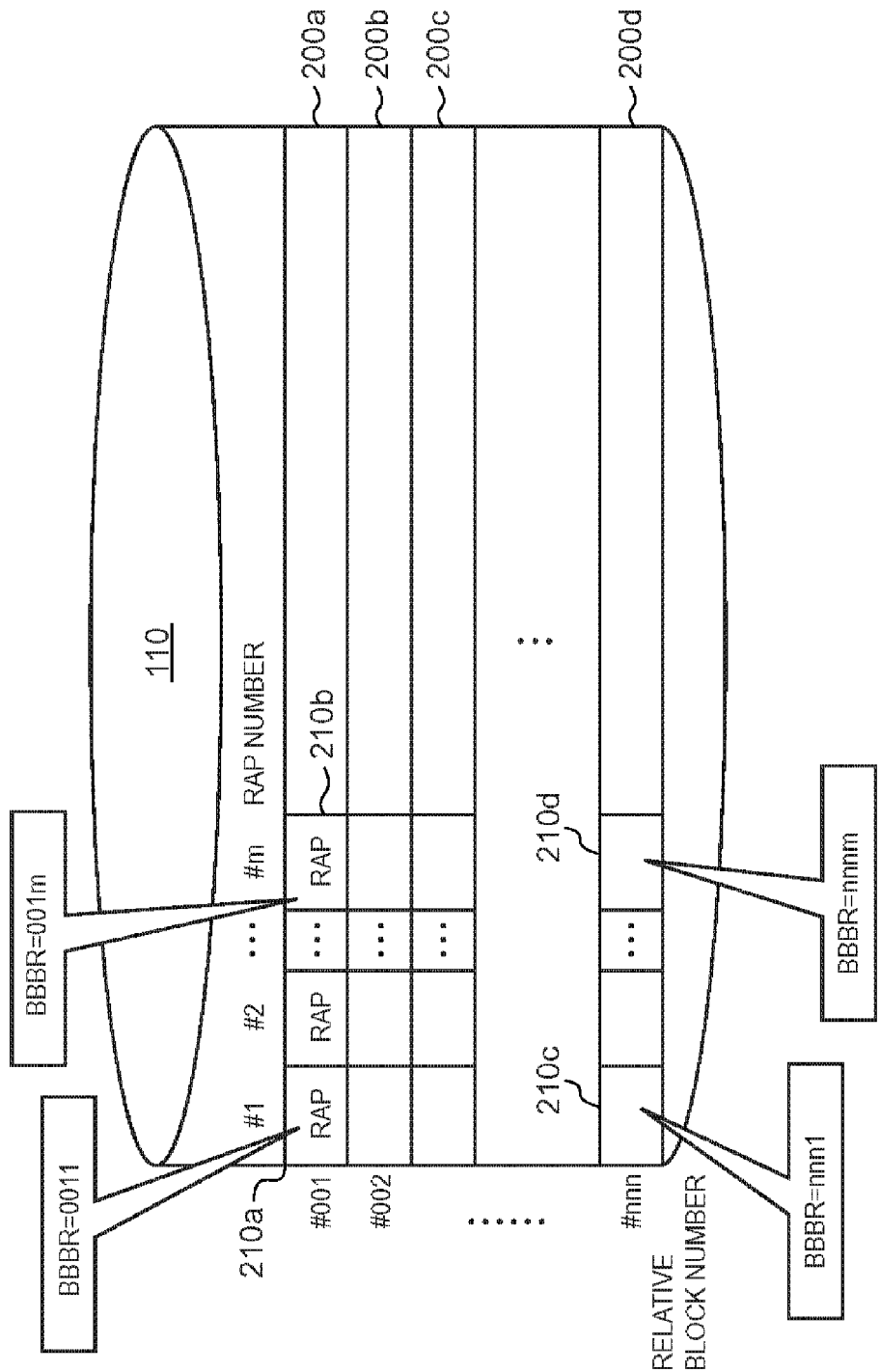
FIG. 2 shows a data structure in a database according to an embodiment of the present invention.

Hereinafter, the data structure in the database 110 will be described with reference to FIGS. 2, 3A, and 3B. FIG. 2 shows the data structure in the database according to an embodiment of the present invention. The database 110 is made up of a plurality of blocks 200a to 200d serving as unit storage areas. Each block 200 may include a root anchor point (hereinafter, referred to as "RAP") 210 which points to a root segment that becomes the top of a record in the database 110. The RAP 210 becomes a reference point of a chain which is traced when data is stored in the database 110 or the data is read from the database 110. It is noted that, in the case where the virtual storage access method (VSAM) is being used in the database 110, the unit storage area including at least one RAP as described above is called a control interval (CI).

Each RAP 210 within the database 110 is referred to by using a RAP identification value which is derived by combining the relative block number (RBN) for identifying the block 200 and the RAP number for identifying the order of precedence of the RAP within that block. That is, the RAP identification value is obtained from the storage location of that RAP. It is noted that, in the following, the RAP identification value may also be represented by "BBBR", where "BBB" corresponds to the relative block number and "R" corresponds to the RAP number. In the example shown in FIG. 2, the RAP 210a is referred to by BBBR=0011, with RBN=001 and RAP number=1. Similarly, the RAP 210d is referred to by BBBR=nnnm, with RBN=nnn and RAP number=m.

The number of RAPs per unit block is designated upon initialization of the database 110, and at least one RAP 210 is generated in each block on initialization. That is, in the database 110, (N×M) RAPs are generated, where N represents the number of blocks in which the RAPs are generated and M represents the number of RAPs per unit block.

Figure 3A:
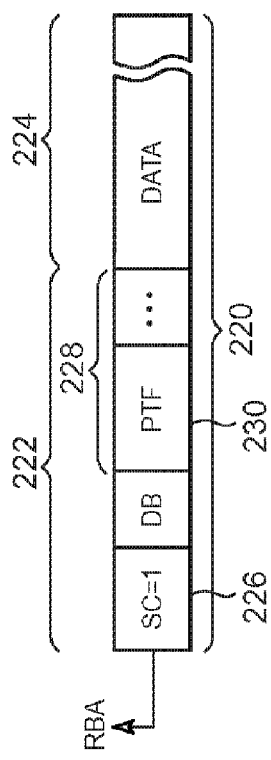
FIGS. 3A and 3B show details of the data structure related to the database of the embodiment.
Figure 3B:
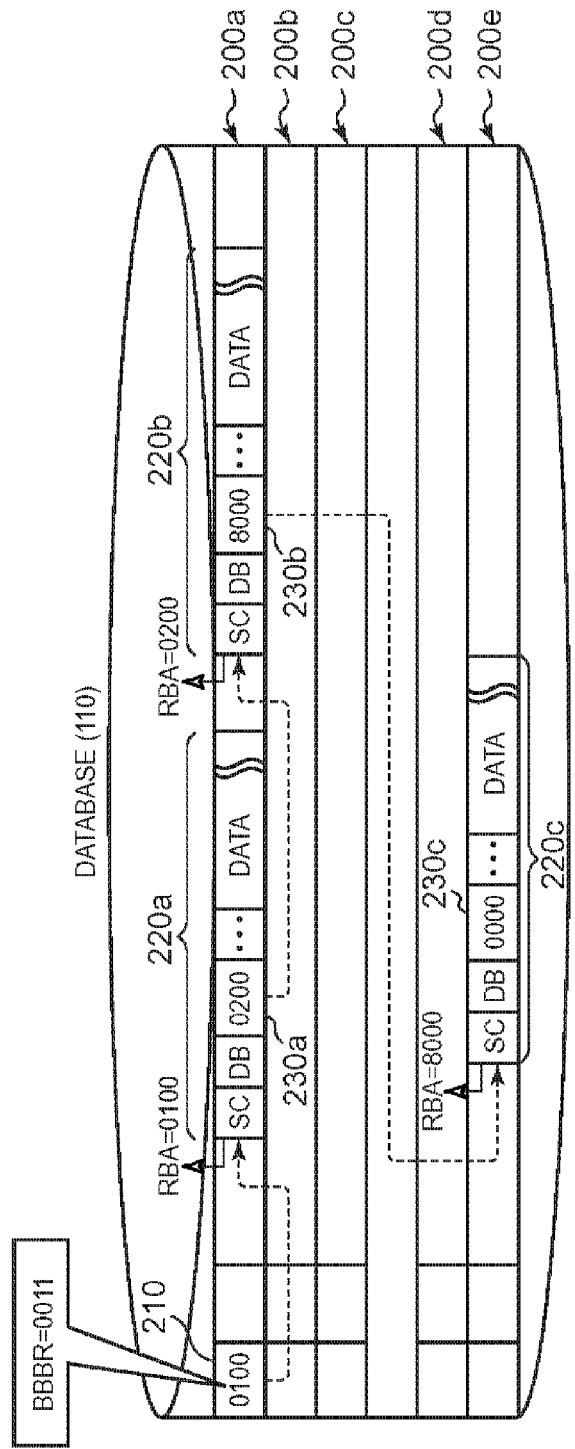

FIGS. 3A and 3B show details of the data structure related to the database of the present embodiment. FIG. 3A shows a detailed data structure of a root segment recorded in the database of the present embodiment. A root segment 220 includes a prefix portion 222 in which information for management thereof is stored, and a data portion 224 in which at least one data element constituting the data to be processed by an application program or the like is stored.

The prefix portion 222 of the root segment 220 is provided with a SC field 226 in which a segment code (SC) for identifying the type of the segment is held, a DB field in which a delete byte (DB) indicating, among others, whether the segment has been deleted or not is held, and a pointer field 228. In the SC field 226 of the root segment 220, the SC value (=1) indicating that the segment is the root segment is held. In the pointer field 228, various pointer values pointing to other segments related to the root segment 220 are stored. The pointer field 228 of the root segment 220 includes a physical twin forward (PTF) pointer which points to another root segment which is in a twin relationship with the root segment 220.

FIG. 3B shows a series of root segments chained in the database of the present embodiment. Each root segment 220 is stored on a disk, with it being started at a storage location expressed by a predetermined retention address. Here, the retention address refers to a position of the start address of the root segment 220 as compared with a predetermined reference address in the database 110, i.e., a relative byte address (RBA). In the RAP 210, a retention address of the root segment pointed to by the RAP is stored as pointer information.

The root segment A 220a shown in FIG. 3B is pointed to by the RAP 210 which is referred to by a predetermined RAP identification value (BBBR=0011), and a retention address (RBA=0100) of the root segment A 220a is held in the RAP 210. The root segment A 220a has a PTF field 230a in which a retention address (RBA=0200) of the root segment B 220b which is in a twin relationship is held. Similarly, the root segment B 220b has a PTF field 230b in which a retention address (RBA=8000) of the root segment C 220c which is also in a twin relationship is held. Furthermore, the root segment C 220c has a PTF field 230c in which an address value (RBA=0000) indicating an end of the chain is held.

In the example shown in FIG. 3B, in the database 110, the root segment A 220a, the root segment B 220b, and the root segment C 220c are chained, with the RAP 210 as a reference point. Such a chain starting at a RAP and linking a plurality of root segments is referred to as a "synonym chain".

In the database 110 of the present embodiment, a hierarchical structure is established which allows a desired root segment to be accessed by tracing a chain, from a corresponding RAP as the reference point, by referring to the pointer values recorded in the RAP and in the PTF fields of the root segments. A prescribed randomizing module 130, shown in FIG. 1, is associated with the database 110, and the RAP to which a root segment is chained is determined by the randomizing module 130. More specifically, the randomizing module 130 converts a provided key value to a relative block number and a RAP number, in accordance with a prescribed mathematical algorithm such as a hash function.

The data storing and reading to and from the database 110 of the present embodiment will further be described. In the case where a new root segment is to be stored in the database 110, its key value is provided to the predetermined randomizing module 130 to determine the RAP to which the new root segment is to be chained. Here, if the randomizing module 130 determines, e.g., the RAP 210 as a new storage location, the retention address of the new root segment is stored in the PTF field 230c of the root segment C 220c. On the other hand, in the case where the root segment C 220c is to be referred to, the prescribed key value corresponding to the root segment C 220c is provided to the randomizing module 130, and a chain is traced, from the RAP 210 specified by the key value as a reference point, to thereby refer to the target root segment C 220c.

Hereinafter, referring again to FIG. 1, the function of verifying the consistency of the pointers in the hierarchical database according to the embodiment of the present invention will be described in detail. The database management apparatus 100 according to the embodiment of the present invention includes: a reading unit 120 configured to sequentially read the blocks constituting the database 110 to generate various work records, which will be described later; a verification unit 140 configured to verify the consistency regarding the database 110 by using the generated work records; and an error output unit 150 configured to output the detected error in the form of a report. The work records are stored in a storage area which is provided by a primary storage device, such as a memory, or a secondary storage device, such as a hard disk, in the database management apparatus 100.

The reading unit 120 of the present embodiment includes a RAP record generation unit 122 for generating a work record related to a RAP, and a root record generation unit 124 for generating a work record related to a root segment. The RAP record generation unit 122 and the root record generation unit 124 constitute a reference point record generation unit and a data record generation unit, respectively, of the present embodiment. Further, the verification unit 140 of the present embodiment includes a chain verification unit 142 which uses the work records generated by the work record generation units 122 and 124 to verify the consistency in a chain (hereinafter, referred to as a "RAP chain") which chains at least one root segment with a RAP as a reference point.

In the embodiment described below, it is assumed that the reading unit 120 generates the work records related to the RAP and the root segments, and that the verification unit 140 uses the work records to verify the consistency in the RAP chain. Alternatively, according to another embodiment, the reading unit 120 may be configured to generate work records related to other pointers or key values in the hierarchical database, in which case the verification unit 140 may use the work records to carry out a process of verifying the consistency of the other pointers or key values. Further, in this case, the process of verifying the consistency of the other pointers or key values may be carried out in parallel with the process of verifying the consistency in the RAP chain.

The RAP record generation unit 122 identifies the RAP within the read block, and combines the RBN of the block with the order of precedence of the RAP within that block to derive a RAP identification value. The RAP record generation unit 122 then generates a work record (hereinafter, referred to as a "pointer record") by associating the RAP identification value derived from the storage location of the RAP with the pointer value held in the RAP, and passes the generated work record to the verification unit 140.

When the root record generation unit 124 identifies, within the read block, a segment having a SC value (=1) indicating that the segment is a root segment, the root record generation unit 124 provides the randomizing module 130 with the key value of the root segment to cause the randomizing module 130 to calculate a RAP identification value. The RAP identification value obtained in this manner is the one that has been calculated by the correct randomizing module 130 and the one for the proper RAP to which the root segment is supposed to be chained. The root record generation unit 124 generates a work record (hereinafter, referred to as a "segment record") by associating the RAP identification value acquired from the randomizing module 130 with the retention address of the identified root segment, and passes the generated work record to the verification unit 140.

The root record generation unit 124 also generates a pointer record by associating the RAP identification value acquired from the randomizing module 130 with the pointer value held in the PTF field of the root segment, and passes the generated pointer record to the verification unit 140. It is noted that the pointer record does not have to be generated when the pointer value held in the PTF field indicates an end of the chain.

The pointer record set 160 generated includes the records related to both the RAP and the root segments, while the segment record set 170 generated includes the records related to the root segments.

The chain verification unit 142 uses the received pointer record set 160 and segment record set 170 to verify the consistency of the RAP chain. When the chain verification unit 142 detects an inconsistency in the RAP chain, it notifies the error output unit 150 to that effect. The error output unit 150 informs a predetermined management terminal (not shown), for example, of the notified inconsistency errors collectively in the form of a report.

The function of verifying the consistency in the RAP chain according to the embodiment of the present invention may optionally verify the correctness of the order of the chained root segments, in correspondence with the restriction that the synonym chain should be formed in accordance with the order of the key values of the root segments. In this case, the root record generation unit 124 may generate the segment record and the pointer record by further attaching thereto the key value of the identified root segment. When the chain verification unit 142 receives the records including the key values, it may use the received pointer record set 160 and segment record set 170 to compare the magnitudes of the key values in the records, to thereby verify the correctness of the chained order of the root segments.

Hereinafter, referring to FIGS. 4 to 7, the process of verifying the consistency of a chain, formed in a hierarchical database, from a RAP as a reference point to the root segments will be described in detail. It is noted that the consistency verification process described with reference to FIGS. 4 to 7 corresponds to the case where the optional verification of the order of key values of the root segments is not designated.

Figure 4:
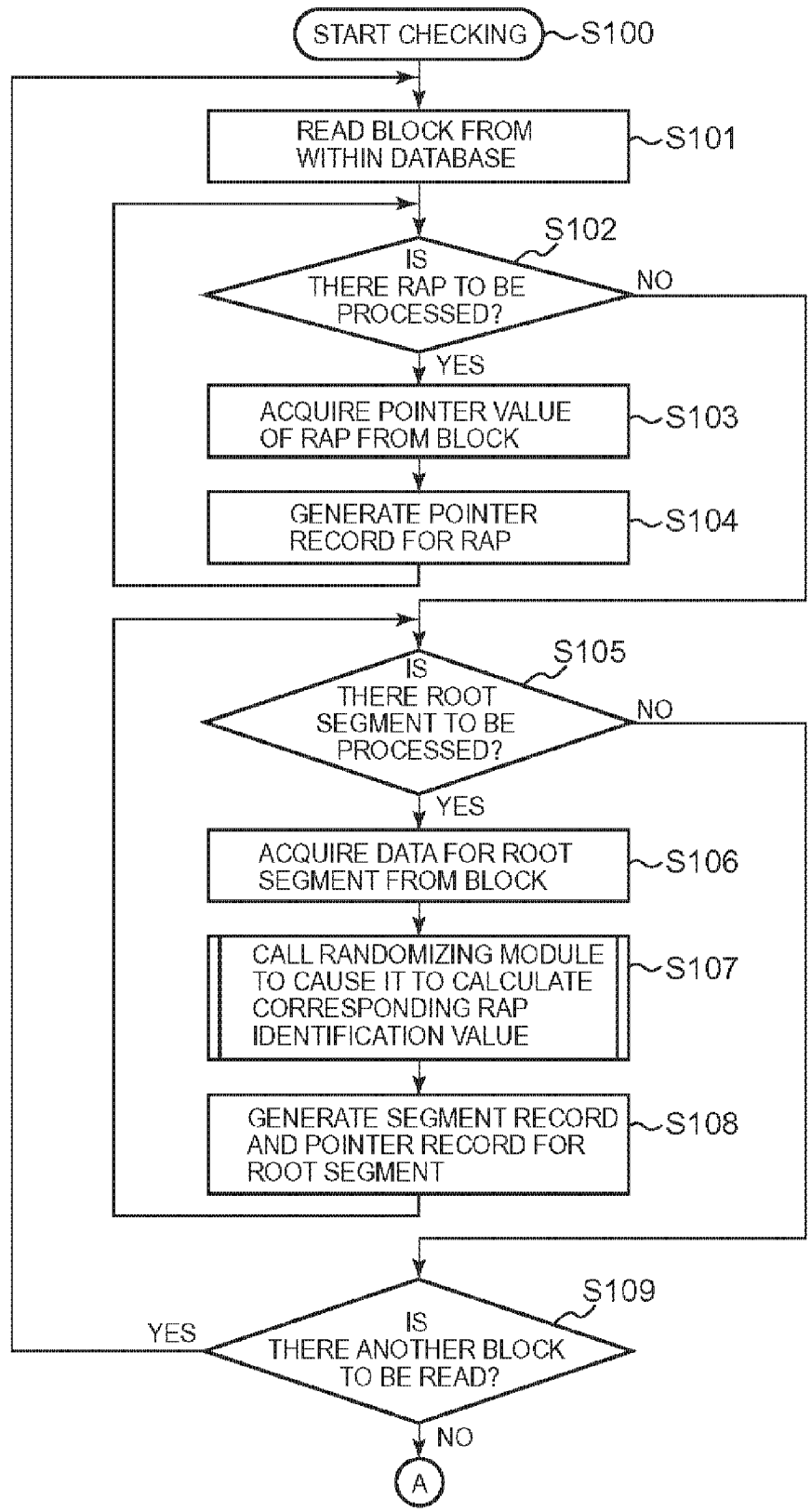
FIGS. 4 and 5 constitute a flowchart for a consistency verification process which is carried out by the database management apparatus according to the embodiment of the present invention.
Figure 5:
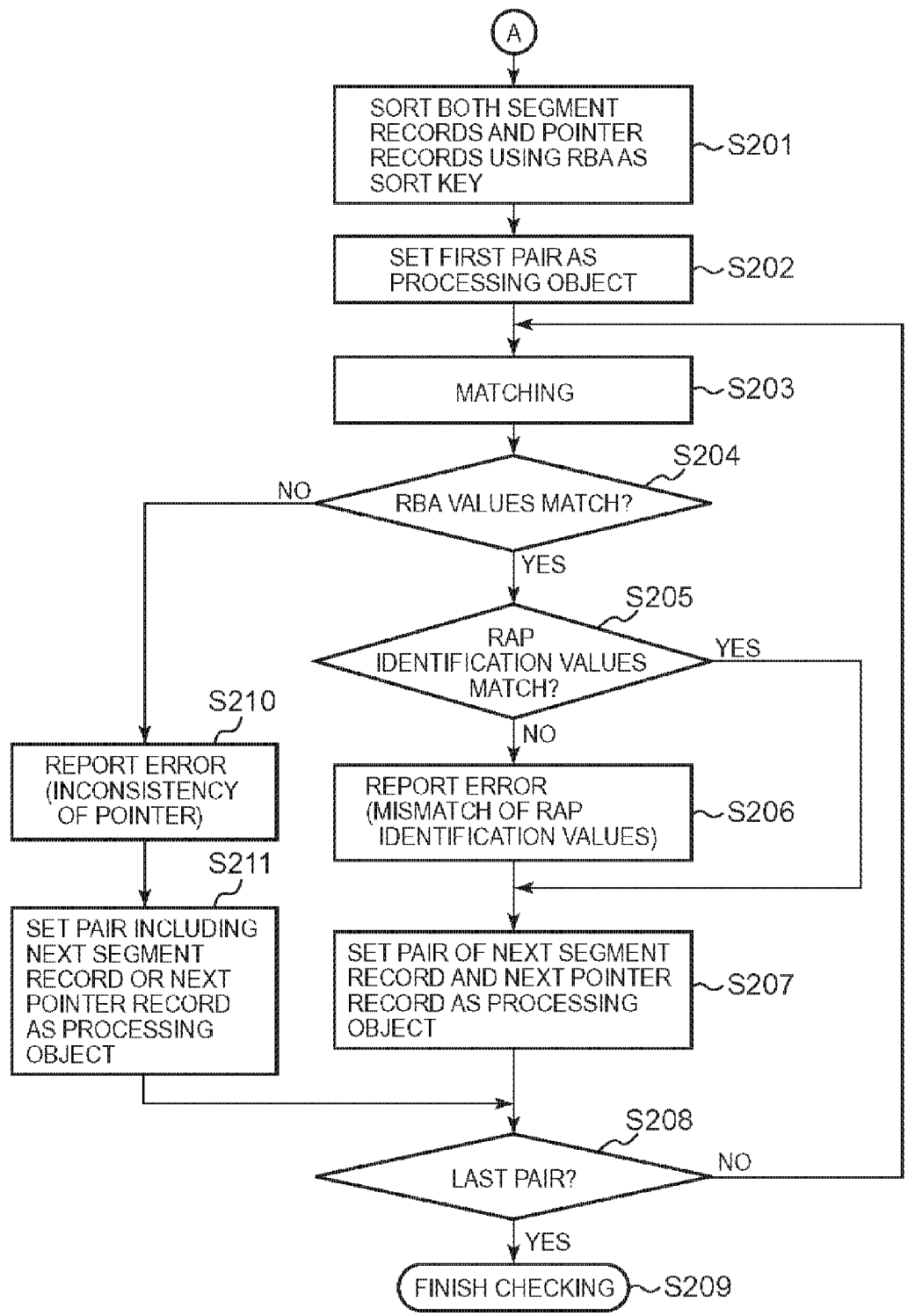

FIGS. 4 and 5 constitute a flowchart for the consistency verification process which is carried out by the database management apparatus 100 of the embodiment of the present invention. The process flows in FIGS. 4 and 5 are connected at a point A. The process shown in FIG. 4 starts in step S100 when the process is called, e.g., in response to a request from a management terminal (not shown) to start the consistency verification process, or in response to a given schedule.

In step S101, the reading unit 120 reads a block from within the database 110, and passes the process to the RAP record generation unit 122. In step S102, the RAP record generation unit 122 identifies a RAP from the read block, to determine whether there is a RAP to be processed. If it is determined in step S102 that there is a RAP to be processed (YES), the process proceeds to step S103.

Figure 6A:
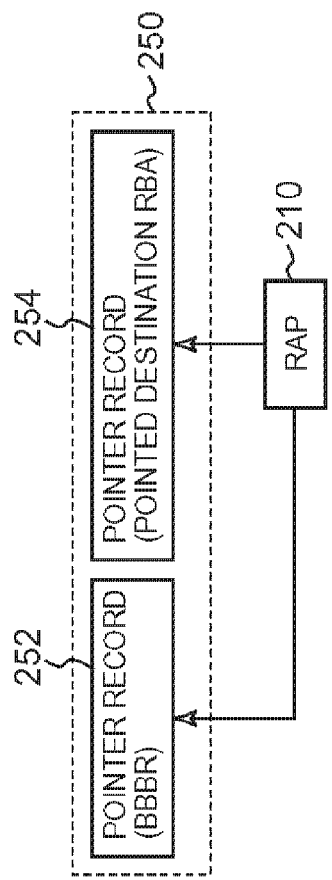
FIGS. 6A and 6B show a process of generating work records, together with a data structure being used.
Figure 6B:
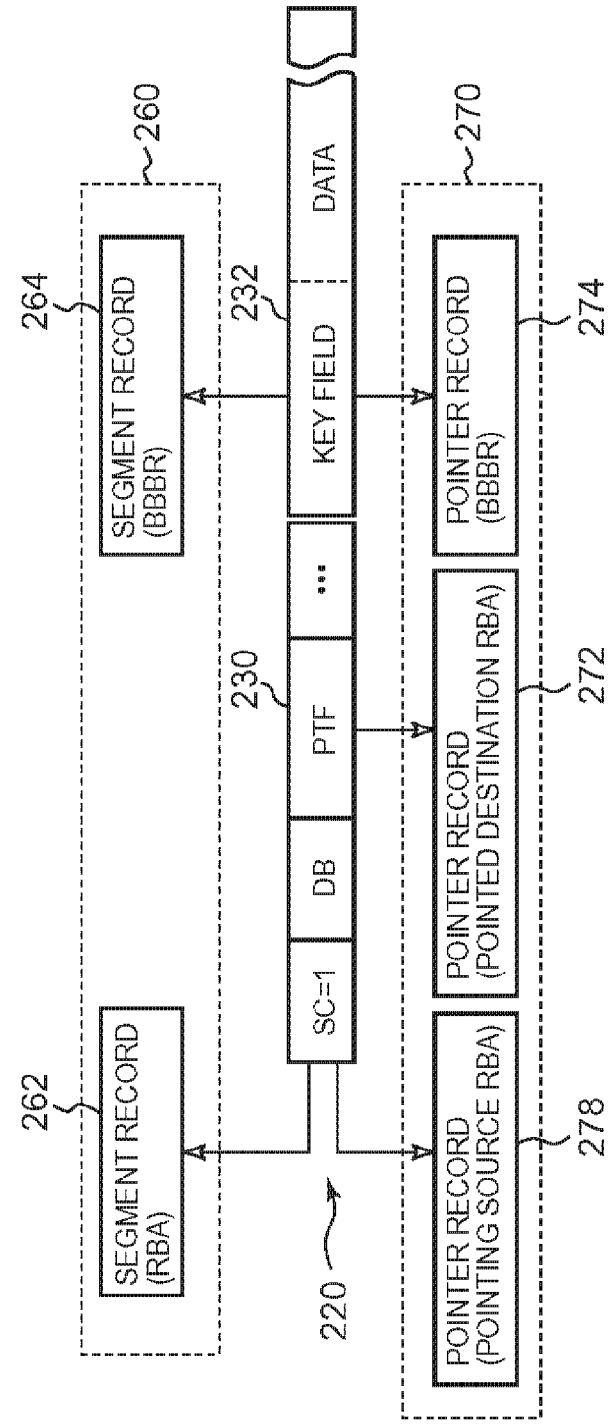

FIGS. 6A and 6B show the process of generating work records, together with the data structure being used. FIG. 6A shows the process of generating a pointer record for a RAP, performed in steps S103 and S104 in FIG. 4, together with the data structure being used. In step S103, the RAP record generation unit 122 acquires a pointed destination RBA 254 held in the RAP identified from within the block. In step S104, the RAP record generation unit 122 combines the RBN of the current block with the RAP number indicating the order of precedence of the RAP within the block to derive a RAP identification value (BBBR), and attaches the RAP identification value to the pointed destination RBA 254 to thereby generate a pointer record 250 for the RAP. The process then loops back to step S102.

Through the loop of steps S102 to S104, the pointer record is generated for each of M pieces of RAPs included in each block. If it is determined in step S102 that there is no more RAP to be processed (NO), the process proceeds to step S105, where the process is passed to the root record generation unit 124.

In step S105, the root record generation unit 124 identifies, from the read block, any segment having the SC value (=1) indicating that the segment is the root segment, to determine whether there is a root segment to be processed. If it is determined in step S105 that there is a root segment to be processed (YES), the process proceeds to step S106.

FIG. 6B shows the process of generating a segment record and a pointer record for a root segment, performed in steps S106 to S108 in FIG. 4, together with the data structure being used. In step S106, the root record generation unit 124 acquires, from the identified root segment, data including its start RBA 262, a pointed destination RBA 272 held in the PTF field 230, and a key value held in a key field 232 in the data portion.

In step S107, the root record generation unit 124 calls the randomizing module 130 by using the acquired key value as an argument, to acquire the RAP identification value calculated by the randomizing module 130. In step S108, the root record generation unit 124 generates a segment record 260 for the root segment by attaching the calculated RAP identification value (BBBR) 264 to the start RBA 262 of the root segment. If the root segment is not the end of the RAP chain, the root record generation unit 124 also generates a pointer record 270 for the root segment by attaching the calculated RAP identification value (BBBR) 274 to the pointed destination RBA 272 in the PTF field. The process then loops back to step S105. In this case, the pointer record 270 for the root segment may be generated by further attaching thereto a pointing source RBA 278, so that the chained order of the root segments can be determined from the work record.

Through the loop of steps S105 to S108, the work records related to the root segments are generated for all the root segments stored in each block. If it is determined in step S105 that there is no more root segment to be processed (NO), the process proceeds to step S109.

In step S109, the reading unit 120 determines whether there is another block to be processed in the database 110. If it is determined in step S109 that there is another block to be processed (YES), the process loops back to step S101 to process the next block. If it is determined in step S109 that there is no more block to be processed (NO), it indicates that all the work records necessary for the consistency verification process have been obtained, so that the process proceeds to the point A.

FIG. 5 shows a process flow following the point A shown in FIG. 4. Through the processes in steps S201 to S211, the chain verification unit 142 uses the received segment record set 170 and pointer record set 160 to verify the consistency of a chain from a RAP as a reference point to at least one root segment.

In the present embodiment, as a technique of verifying the consistency of a chain having the RAP as a reference point, it is possible to suitably adopt the technique of sorting and merging the segment record set 170 and the pointer record set 160 using the RBA as a sort key and comparing the values of the pointed destination RBA and the start RBA. According to this technique, in the case where there is found a pair of RBA values matching each other and if the RAP identification values match for that pair, it is determined that the chain corresponding to the compared two RBA values is consistent. On the other hand, if there is no pair of RBA values matching each other or if the RAP identification values do not match, an inconsistency is detected.

Hereinafter, the process of verifying the consistency of a RAP chain will be described in more detail. In step S201, the chain verification unit 142 sorts both the segment record set 170 and the pointer record set 160, using the RBA as a sort key. In step S202, the chain verification unit 142 sets a first pair of the sorted work records as a processing object. In step S203, the chain verification unit 142 performs matching on the pair as the processing object. Specifically, it compares the retention address (start RBA) of the segment record with the pointer value (pointed destination RBA) of the pointer record.

In step S204, the chain verification unit 142 determines whether the compared retention address (start RBA) and pointer value (pointed destination RBA) coincide with each other. If it is determined in step S204 that the RBA values match (YES), the process proceeds to step S205. In step S205, it is further determined whether the RAP identification values for the pair of the processing object coincide with each other.

If it is determined in step S205 that the RAP identification values do not match (NO), the process proceeds to step S206. In this case, although the chain has been established corresponding to the compared two RBA values, the root segment located downstream is not chained from the proper RAP from which it is supposed to be chained. Further, in this case, the part of the chain located downstream of the root segment for which an inconsistency has been detected is inconsistent. Thus, in step S206, the chain verification unit 142 notifies the error output unit 150 of an error to the effect that the RAP identification values do not match.

If it is determined in step S205 that the RAP identification values match (YES), the process proceeds directly to step S207. In step S207, the segment record and the pointer record are each advanced to the next record, and the next pair is set as a processing object. The process then proceeds to step S208.

Referring again to step S204, if it is determined in step S204 that the RBA values do not match (NO), the process proceeds to step S210. In this case, the chain itself is not established for the compared two RBA values. Thus, in step S210, the chain verification unit 142 notifies the error output unit 150 of an error to the effect that the pointer is inconsistent. In step S211, either the segment record or the pointer record is advanced to the next record, depending on the magnitudes of the RBA values of the retention address and the pointer value, and the next pair is set as a processing object. The process then proceeds to step S208. For example, in the case where the matching is to be performed in ascending order of the RBA values, the record with the smaller RBA value is advanced to the next record.

In step S208, it is determined whether the pair of segment record and pointer record as the processing object is a last pair. If it is determined in step S208 that it is the last pair (YES), the process is finished in step S209. If it is determined in step S208 that it is not the last pair (NO), the process loops back to step S203, where matching is performed on the next pair of the processing object.

FIG. 7 shows a flow of the process of verifying the consistency of a RAP chain according to the embodiment of the present invention, together with the data structure being used. In FIG. 7, a chain is formed in the database 110, from the RAP 210a referred to by a specific RAP identification value, BBBR=0011, as a reference point, through a root segment A 220a and a root segment B 220b to a root segment C 220c. Here, it is assumed that the root segment C 220c, which is supposed to be chained from the RAP 210b referred to by the RAP identification value BBBR=0511, has been incorrectly chained from the RAP 210a (BBBR=0011) as the reference point.

When the database 110 shown in FIG. 7 is read, the work record generation units 122 and 124 generate a set of pointer records 250 for the RAP, and a set of segment records 260 and a set of pointer records 270 for the root segments. Then, the chain verification unit 142 sorts the sets of pointer records 250 and 270 and also sorts the set of segment records 260, and performs matching on the record sets. As a result, pairs PAIR1 and PAIR2 that are consistent and a pair PAIR3 that is inconsistent are detected. That is, it is determined that the root segment C 220c with RBA=8000 has been chained from a wrong RAP 210a with BBBR=0011.

Here, assumed that, besides the root segment C 220c, the root segment B 220b is also supposed to be chained from the RAP 210b having the RAP identification value BBBR=0511. In this case, an inconsistency of the RAP identification values will not be detected when the pointer record of the root segment B 220b is checked against the segment record of the root segment C 220c. However, an inconsistency of the RAP identification values is detected when the pointer record of the root segment A 220a is checked against the segment record of the root segment B 220b, and accordingly, it is recognized that the chain from the root segment B 220b to the root segment C 220c, located downstream thereof, is also incorrect.

According to the process of verifying the consistency of the RAP chain in the embodiment of the present invention, the RAP identification value obtained from the storage location and the proper RAP identification value obtained through calculation by the randomizing module 130 are contained in the work records being compared. This makes it possible to determine whether a certain root segment is chained from a correct RAP.

Furthermore, the RAP identification values are contained in both the pointer record 270 and the segment record 260 which are generated for the root segment. This enables verification of the consistency of the RAP identification values between two root segments in a twin relationship which are chained by a pointer, and consequently, enables verification of the consistency through the entire chain from the RAP to the root segment at the end of the chain.

Hereinafter, referring to FIGS. 4 and 8 to 10, another process of verifying the consistency of a chain, formed in a hierarchical database, from a RAP as a reference point to at least one root segment will be described in detail. It is noted that the consistency verification process described with reference to FIGS. 4 and 8 to 10 corresponds to the case where the option to verify the consistency of the order of key values of the root segments is designated. This process is called, e.g., when the option is designated in a request to start the verification process, issued from a management terminal (not shown), or when the option is designated in a schedule.

Figure 8:
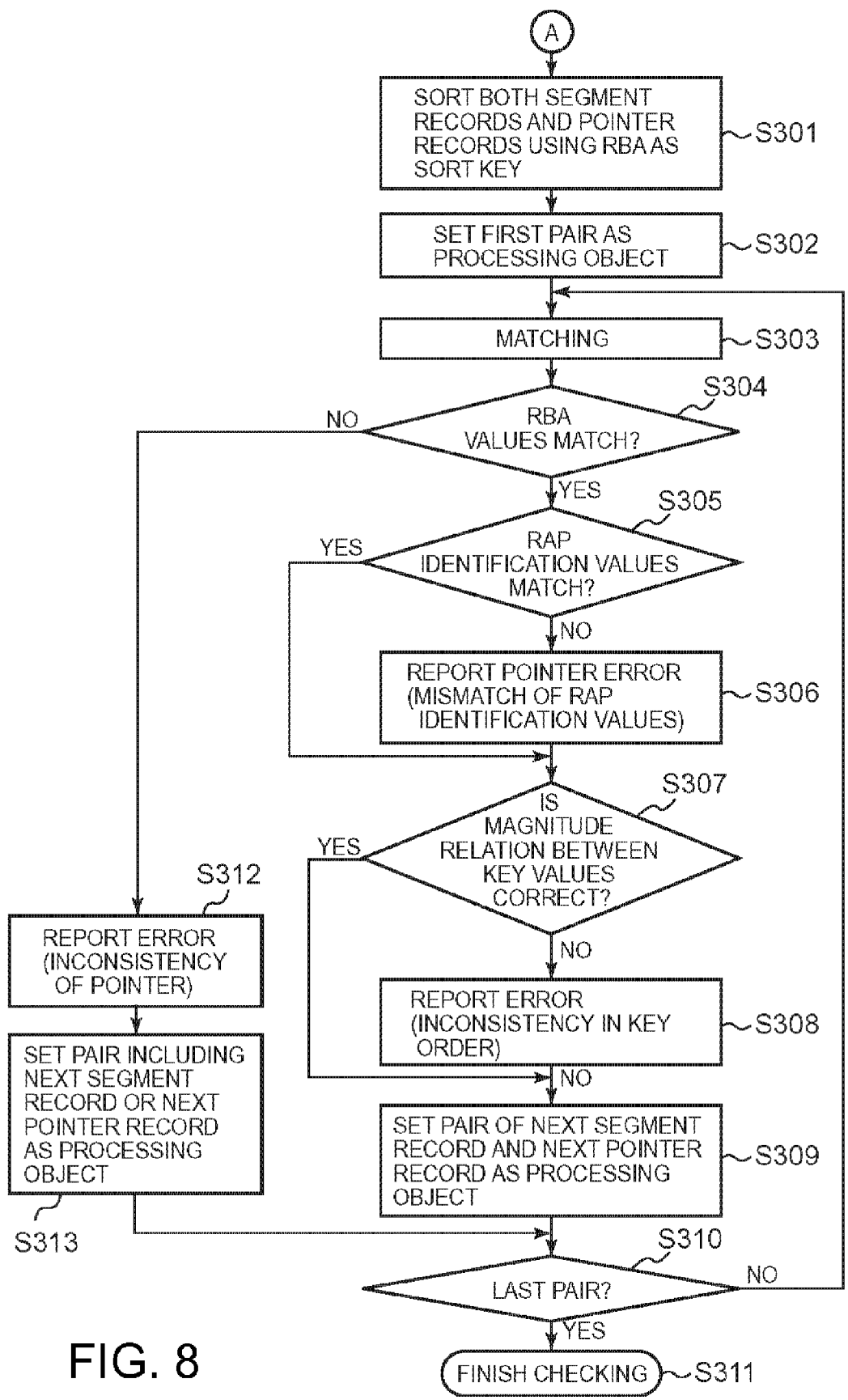
FIG. 8 is a flowchart for another consistency verification process which is carried out by the database management apparatus of the embodiment of the present invention.

FIG. 8 is a flowchart for the other consistency verification process which is carried out by the database management apparatus 100 according to the embodiment of the present invention. FIG. 8 continues from the point A shown in FIG. 4. In this other process of verifying the consistency of a chain, the process flow up to the point A is the same as the one described above, except for steps S104 and S108.

FIGS. 9A and 9B show the process of generating work records according to the other process of verifying the consistency of a chain, together with the data structure being used. FIG. 9A shows the process of generating a pointer record for a RAP, performed in steps S103 and S104 in FIG. 4, together with the data structure. In this other process, in step S104, the RAP record generation unit 122 generates a pointer record 280 for a RAP by attaching a RAP identification value (BBBR) 282 to a pointed-side RBA 284, and also attaching thereto a key value 286 of "NULL".

FIG. 9B shows the process of generating a segment record and a pointer record for a root segment, performed in steps S106 to S108 shown in FIG. 4, together with the data structure. In this other process, in step S108, the root record generation unit 124 generates a segment record 290 for a root segment by attaching a RAP identification value 294 calculated by the randomizing module 130 to a start RBA 292 of the root segment, and also attaching thereto a key value 296 held in the key field 232 in the data portion.

Furthermore, in step S108, the root record generation unit 124 generates a pointer record 300 for the root segment by attaching the calculated RAP identification value 304 to a pointed-side RBA 302 in the PTF field 230, and also attaching thereto a key value 306 in the key field 232. In this case, a pointing source RBA 308 may also be attached, so that the chained order of the root segments can be determined from the work record.

Subsequently, in the processes in steps S301 to S313 shown in FIG. 8, the chain verification unit 142 uses the received segment record set and pointer record set to verify the consistency of a chain from a RAP as a reference point to at least one root segment, and also verify the order of the key values.

In step S301, the chain verification unit 142 sorts both the set of segment records 290 and the set of pointer records 280 and 300, using the RBA as a sort key. In step S302, the chain verification unit 142 sets the first pair of the sorted work records as a processing object. In step S303, the chain verification unit 142 performs matching on the pair as the processing object, and in step S304, it determines whether the compared retention address (RBA) and pointer value (RBA) coincide with each other. If it is determined in step S304 that the RBA values match (YES), the process proceeds to step S305. In step S305, it is further determined whether the RAP identification values for the pair as the processing object coincide with each other.

If it is determined in step S305 that the RAP identification values do not match (NO), the process proceeds to step S306. In step S306, the chain verification unit 142 notifies the error output unit 150 of an error to the effect that the RAP identification values do not match. If it is determined in step S305 that the RAP identification values match (YES), the process proceeds directly to step S307.

In step S307, the chain verification unit 142 determines whether there is no contradiction in magnitude relation of the key values. For example, in the case where there is a restriction that the root segments should be chained in ascending order of their key values, the key value for the segment record needs to be greater than the key value for the pointer record. If the root segments should be chained in descending order of their key values, the key value for the pointer record needs to be greater than the key value for the segment record. In step S307, the determination as to whether there is a contradiction or not is made in accordance with whether the magnitude relation of the key values conforms to the restriction.

If it is determined in step S307 that there is a contradiction in magnitude relation of the key values (NO), the process proceeds to step S308. In step S308, the chain verification unit 142 notifies the error output unit 150 of an error to the effect that the order of the keys is inconsistent. If it is determined in step S307 that there is no contradiction in magnitude relation of the key values (YES), the process proceeds directly to step S309. In step S309, the segment record and the pointer record are each advanced to the next record, and the next pair is set as a processing object. The process then proceeds to step S310.

Referring again to step S304, if it is determined in step S304 that the RBA values do not match (NO), the process proceeds to step S312, where the chain verification unit 142 notifies the error output unit 150 of an error to the effect that the pointer is inconsistent. In step S313, either the segment record or the pointer record is advanced to the next record, in accordance with the magnitude of the RBA value, and the next pair is set as a processing object. The process then proceeds to step S310.

In step S310, it is determined whether the pair of segment record and pointer record as the processing object is a last pair. If it is determined in step S310 that it is the last pair (YES), the process is finished in step S311. If it is determined in step S310 that it is not the last pair (NO), the process loops back to step S303, where matching is carried out for the next pair as the processing object.

Figure 10:
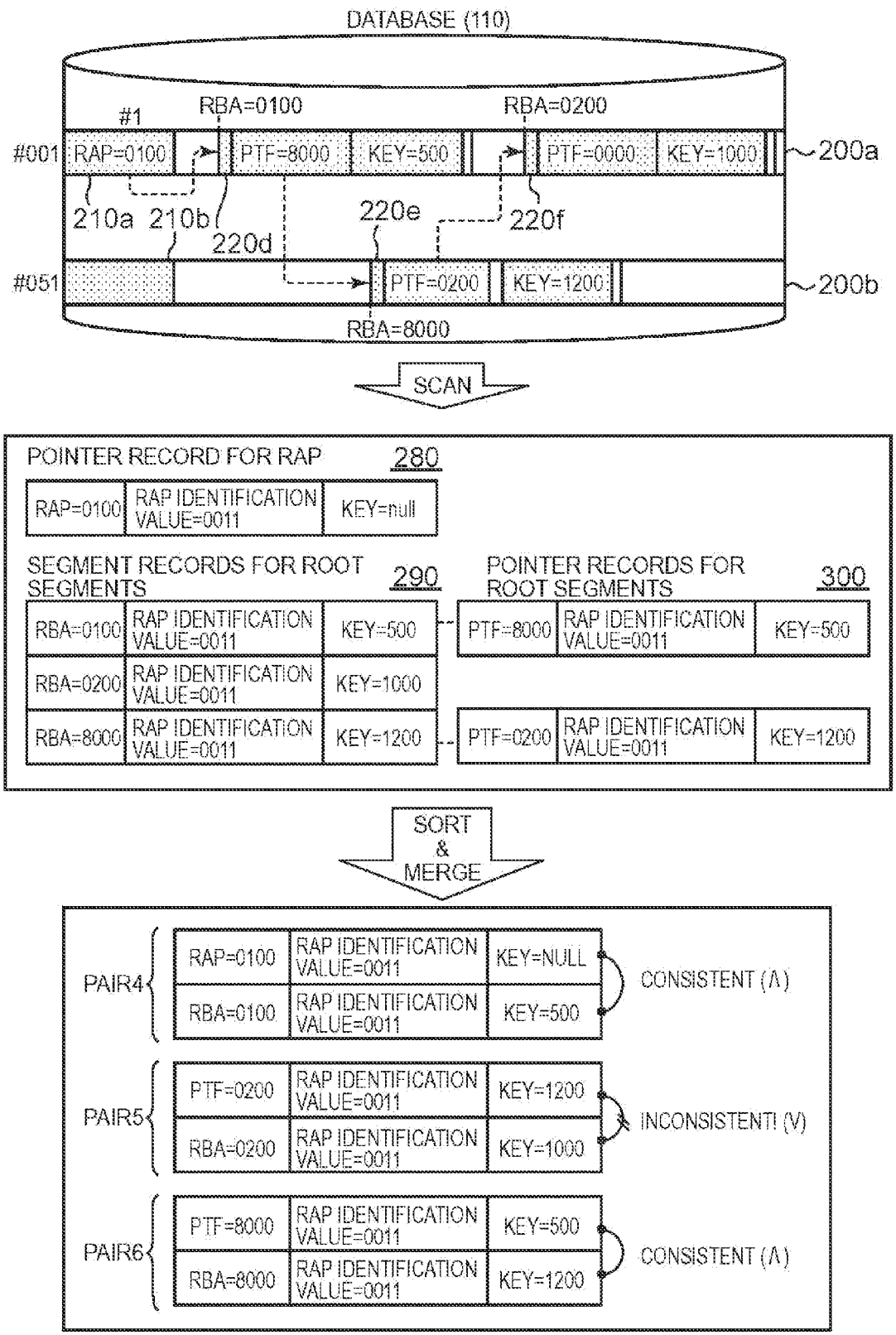
FIG. 10 shows a flow of the other consistency verification process of the embodiment of the present invention, together with a data structure being used.

FIG. 10 shows a flow of the other consistency verification process according to the embodiment of the present invention, together with the data structure being used. In FIG. 10, a chain is formed in the database 110, from the RAP 210a referred to by the RAP identification value BBBR=0011 as a reference point, through a root segment D 220d and a root segment E 220e, to a root segment F 220f. Here, it is assumed that all the root segments 220d, 220e, and 220f have been chained from a correct RAP.

When the database 110 shown in FIG. 10 is read, a set of pointer records 280 for the RAP as well as a set of segment records 290 and a set of pointer records 300 for the root segments are generated by the work record generation units 122 and 124. Then, both the set of pointer records 280, 300 and the set of segment records 290 are sorted and matched against each other by the chain verification unit 142, whereby the pairs PAIR4 and PAIR6 in which there is no contradiction in magnitude relation of the key values and the pair PAIR5 in which there is a contradiction in magnitude relation of the key values are detected. In PAIR5, the key value for the pointer record is greater than the key value for the corresponding segment record, and it is thus determined that the root segments 220d, 220e, and 220f are not chained in ascending order of the key values. Although PAIR6 appears to be consistent at first glance, it can be notified in the report that the chain is inconsistent, because the neighboring PAIR5 is inconsistent.

According to the above-described process of verifying the consistency in the RAP chain in the case where the option to verify the consistency in the order of key values of the root segments has been designated, the key values are contained in both the pointer record and the segment record generated for the root segment. This enables verification of the consistency in the order of key values in a chain between a root segment and its twin segment. Consequently, it is possible to verify the perfectibility of the chain from the reference point to the segment, formed in the hierarchical database.

It has been assumed in the above description that both the RAP identification value and the key value are contained in the pointer record and the segment record generated for the root segment. This means that the RAP identification value itself is used as verification data. Alternatively, in another embodiment, it may be configured such that the RAP identification values are not contained in the case where the key values are contained.

In this embodiment, the process in step S107 shown in FIG. 4 is not performed, and in step S108, the root record generation unit 124 generates the segment record 290 and the pointer record 300 for the root segment by attaching thereto the key value 296 and 306 held in the key field 232 in the data portion, while not attaching thereto the RAP identification value 294 and 304. Then, prior to the determination in step S305 shown in FIG. 8, the chain verification unit 142 calls the randomizing module 130 associated with the database 110, by using as an argument the key value included in the work record for the root segment to be subjected to matching, to thereby acquire the RAP identification value calculated by the randomizing module 130. In step S305, it is determined whether the RAP identification values coincide with each other for the pair of the processing object. In this case, the key value is used as the verification data which gives the RAP identification value in connection with the randomizing module 130.

In this embodiment, it is unnecessary to call the randomizing module 130 during the process of reading the database 110. This can reduce the total time required for the database reading process, and also reduce the size of each work record. It is noted that whether to attach the RAP identification value in addition to the key value may be chosen in accordance with the environment and/or the characteristics of the database to be verified.

Figure 11:
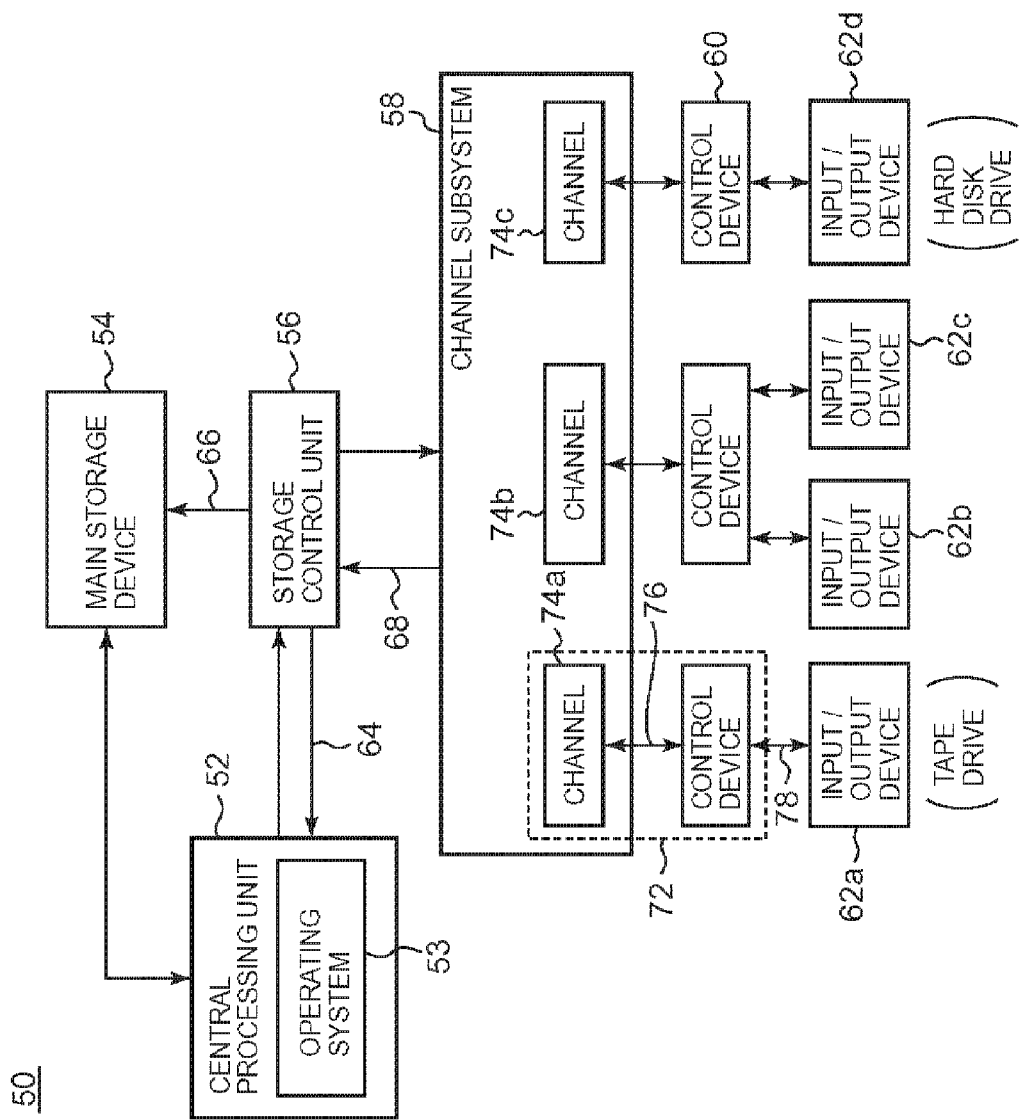
FIG. 11 shows, by way of example, a hardware configuration of a database management apparatus.
Figure 12:
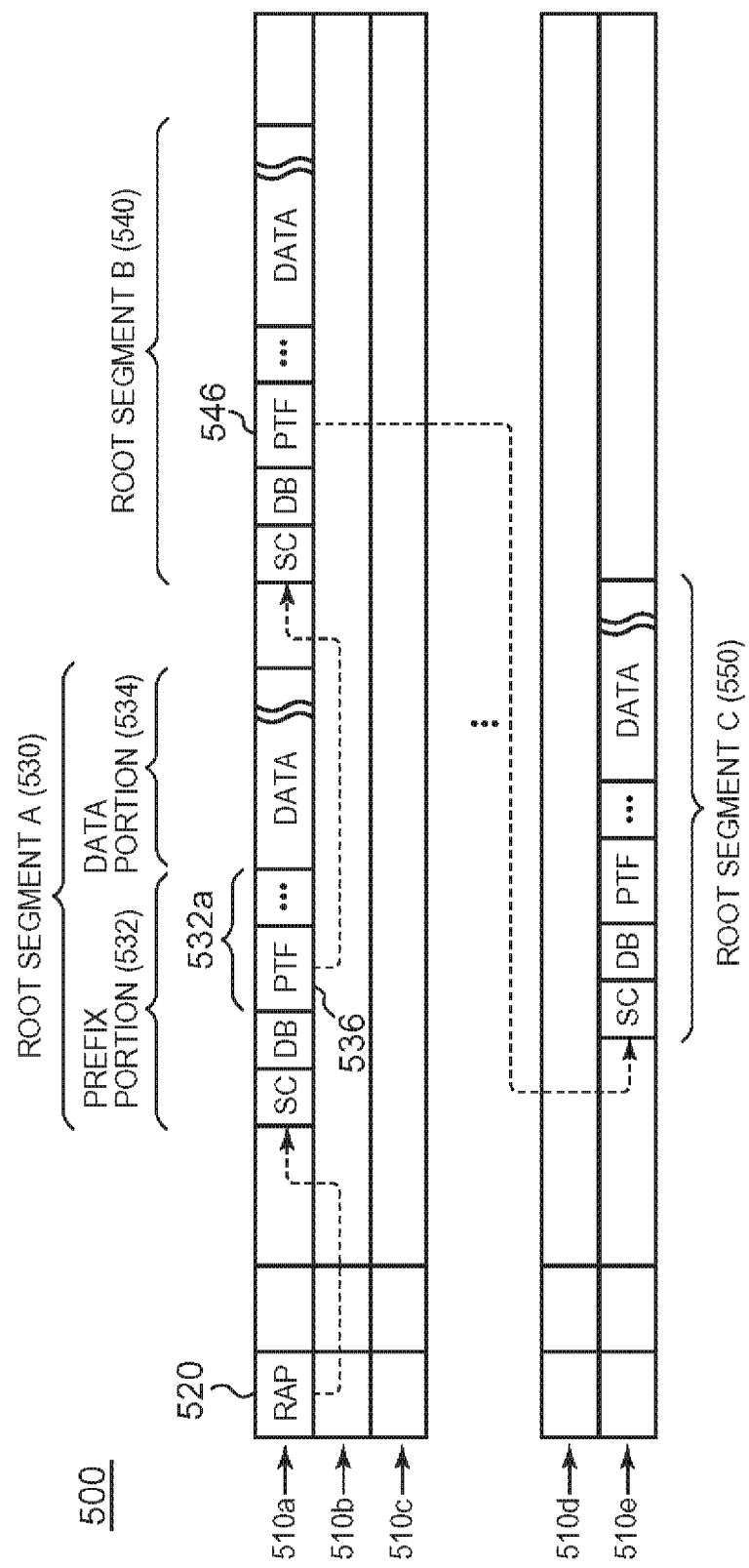
FIG. 12 is a schematic diagram showing a series of root segments which are chained in a hierarchical database.

Hereinafter, a hardware configuration of the database management apparatus will be described. FIG. 11 shows, by way of example, the hardware configuration of the database management apparatus 100. FIG. 11 shows the case where the database management apparatus 100 is composed of a large-scale general-purpose computer such as a mainframe 50. The mainframe 50 includes at least one central processing unit 52, a main storage device 54, a storage control unit 56, a channel subsystem 58, at least one control device 60, and at least one input/output device 62a to 62d.

The main storage device 54 stores data and programs which are input from the input/output devices 62a to 62d. When receiving designation of an address from the central processing unit 52 or the channel subsystem 58, the main storage device 54 sends the data stored at that address to the central processing unit 52 or the channel subsystem 58. The main storage device 54 is configured such that it can quickly read/write the stored data, thereby enabling high-speed processing by the central processing unit 52.

The central processing unit 52 is responsible for overall control of the mainframe 50, and runs an operating system 53, for example. The operating system 53 controls execution of the programs and input/output processing in the mainframe 50. The operating system 53 may control execution of another program running on the central processing unit 52. For example, it can control, in addition to execution of the program corresponding to the consistency verification program of the present embodiment, execution of a DBMS program for managing the hierarchical database. The operating system 53 may further control data transfer in each of the input/output devices 62a to 62d.

The storage control unit 56 is connected to the central processing unit 52 via a bus 64 which enables two-way or one-way communication. The storage control unit 56 is also connected to the main storage device 54 via a bus 66, and also connected to the channel subsystem 58 via a bus 68. The storage control unit 56 may perform a so-called queuing process in which it temporarily stored an access request received from the central processing unit 52 or the channel subsystem 58, for example, and sends the access request to the main storage device 54 at a predetermined time.

The channel subsystem 58 is connected to the respective control devices 60 via data transfer paths 76. The channel subsystem 58 controls data transfer between the input/output devices 62a to 62d and the main storage device 54. This reduces the processing load for the central processing unit 52 to communicate with the input/output devices 62a to 62d, so that the arithmetic processing by the central processing unit 52 and the input/output processing by the input/output devices 62a to 62d can be carried out in parallel. As a result, an efficient operation of the mainframe 50 is ensured.

Furthermore, the channel subsystem 58 performs data transfer to and from the input/output devices 62a to 62d using at least one channel path 72. Each channel path 72 has a channel 74 provided in the channel subsystem 58. Each channel path 72 also has at least one control device 60 and a data transfer path 76. Here, the data transfer path 76 may be, e.g., a serial link based on ESCON® (Enterprise Systems Connection Architecture). Alternatively, the data transfer path 76 may be, in place of or in addition to ESCON®, a parallel OEMI, or FICON® (Fibre Connection).

The control device 60 is connected to at least one of the input/output devices 62a to 62d via a bus 78, to control the at least one of the input/output devices 62a to 62d. The control device 60 may control the timing of data transfer in the respective input/output devices 62a to 62d.

Each of the input/output devices 62a to 62d carries out data transfer to and from the main storage device 54, through the control device 60, the channel subsystem 58, and the storage control unit 56 in sequence. Here, the input/output device 62a is specifically a magnetic tape drive, while the input/output devices 62b to 62d are hard disk drives. In place thereof, or in addition thereto, each of the input/output devices 62a to 62d may be a punch card reader, a display device, a keyboard, a printer, a communication device, any of various sensors, or other storage device. One of the input/output devices 62 may be connected to the database 110 to control accesses.

In the above description, the database management apparatus 100 has been configured as the mainframe 50. Alternatively, the database management apparatus 100 may be configured as a midrange computer, a workstation, a personal computer, or the like.

As described above, according to the embodiment of the present invention, the information processing apparatus, and the information processing method, program, and recording medium are provided which perform a consistency verification process with which the consistency of a chain formed in a hierarchical database from a reference point to a segment can be verified efficiently.

According to the embodiment of the present invention, in a chain from a RAP as a reference point to a root segment, which is formed in a hierarchical database, the consistency between the RAP and the root segment, or the consistency between one root segment and another root segment which is in a twin relationship with that root segment, can be verified. Consequently, the consistency through the entire chain from the RAP as the reference point to at least one root segment can be detected efficiently.

There is a probability, as explained above, that a root segment may have not been chained from a correct RAP even in the case where a pointer is consistent in the chain from the RAP. The embodiment of the present invention is able to determine the correctness of the RAP to which the root segment is chained. Accordingly, it is possible to suitably detect any inconsistency in the chain from the RAP as a reference point to at least one root segment, which would occur in the database (i) when a root segment has been stored using a wrong RAP identification value different from the one assigned thereto by the randomizing module, due to a program error in the DBMS or in the database generating utility during the process of storing the root segment, (ii) when the randomizing module has calculated a wrong value due to an error, at the time when the root segment is stored, or (iii) when a wrong randomizing module has been used temporarily, due to an operation mistake.

As another process of verifying the consistency of a synonym chain, the following technique may be used. Specifically, during the reading process, the RAP information, including the pointer and the RAP identification value for the RAP, and the root segment information, including the start RBA, PTF pointer value, and key value for the root segment, are separately copied on a table reserved in a memory. Then, in the case where the root information having the retention address which coincides with the pointer value for the RAP is searched for afterwards and there is found the matching one, the randomizing module is called, using the key value as an argument, to detect inconsistency by comparing the RAP identification value in the RAP information with the RAP identification value calculated. This technique of deploying the table on the memory and searching the table, however, has a limitation on the memory area, and if the key fields of the root segments occupy about a half of the storage area in the database, a memory having a huge capacity is required. There is a case where even a four-gigabyte memory may be required, depending on the definitions of the database and segments. Particularly in the case where it is necessary to verify the consistency of the pointers related to hundreds or thousands of databases, using a several gigabyte memory for the process of verifying the pointers within one database may cause processing in the system to be delayed or stopped, which is generally unacceptable.

In contrast, according to the above-described embodiment of the present invention, in the case where the process of verifying the consistency of the key values as described above is not designated, the increase of memory size required for the segment records and pointer records prepared for verification of the consistency of a chain from the RAP as a reference point is limited to only the byte size of the RAP identification value, which may be, e.g., four bytes per record. This rate of increase in memory size is only about 10% as compared with the size of the entire work record (including other information about the database, a segment code, and information about the pointer types and others; which generally account for about 40 bytes). Even in the case where the process of verifying the consistency of the key values is designated, it generally requires an increase of memory size of only the byte size of the key value, which may be several bytes. Furthermore, even if the key value requires several tens of bytes, the technique of the present invention still has an advantage over the technique of deploying the information on the memory in that adverse effects on storage capacity and processing time are small.

Moreover, according to the embodiment of the present invention, the consistency of the RAP chain can be verified using the logic of sorting the segment records and the pointer records and checking them against each other. This technique has an advantage over the above-described technique of deploying the table on the memory in that the extra logic for checking the valid keys, including searching the table and copying the information to the table, is unnecessary.

The consistency verification function of the embodiment of the present invention has been described above by giving as an example the database having a specific data structure. The consistency verification function of the present invention, however, may be applied to any type of hierarchical database, as long as a chain may be formed therein from a reference point, derived by a certain module, to a prescribed segment.

While the functional units and processing performed thereby have been described above for easy understanding of the present invention, the present invention is not limited to the specific functional units performing specific processing as described above. The functions for implementing the above-described processing may be assigned to any functional units, in consideration of processing efficiency as well as programming efficiency upon implementation.

The above-described functions of the present invention may be implemented using a device-executable program which is written in a legacy programming language or an object-oriented programming language such as assembler, C, C++, Java®, JavaBeans®, Java® Applet, JavaScript®, Perl, Ruby, or the like. The program may be stored in a device-readable recording medium for distribution or may be transmitted for distribution.

While the present invention has been described with reference to a specific embodiment, the present invention is not restricted to the above-described embodiment. Rather, various additions, modifications, deletions, as well as other embodiments are possible within the range conceivable by those skilled in the art, and they are included in the scope of the present invention as long as they exert the functions and effects of the present invention.

What is claimed is:

1. An information processing method for verifying a hierarchical database, comprising:
   in response to reading a root anchor point (RAP) stored in the hierarchical database, generating a first pointer record comprising a first RAP identification value, determined from a storage location of the RAP, associated with pointer information retained at the RAP;
   in response to reading a root segment in the hierarchical database, generating a segment record and a second pointer record,
      wherein the segment record comprises a second RAP identification associated with a retention address of the root segment, the second RAP identification value calculated by a calculation module, the calculation module calculating, for the root segment in the hierarchical database, the second RAP identification value identifying a RAP which points to the root segment,
      wherein the second pointer record comprises the second RAP identification value associated with pointer information retained in the root segment pointing to a twin segment thereof; and
   verifying a consistency of a chain formed in the hierarchical database from the RAP to the root segment by comparing the segment record with the first and second pointer records, wherein the verifying the consistency further comprises:
      determining that the chain is inconsistent in the case where a mismatch between the RAP identification values is found for the segment record and the first pointer record whose retention address and pointer information coincide with each other; and
      determining that the chain is inconsistent in the case where a mismatch between the RAP identification values is found for the segment record and the second pointer record whose retention address and pointer information coincide with each other.

2. The information processing method according to claim 1, wherein the generating the segment record comprises: attaching a key value retained in the root segment to the segment record, and wherein the generating the second pointer record comprises: attaching the key value retained in the root segment to the second pointer record.

3. The information processing method according to claim 2, wherein the verifying the consistency comprises: sorting the generated segment records and the generated first and second pointer records, and checking the root segment against the first or second pointer records to detect an inconsistency in the chain.

4. The information processing method according to claim 1, wherein the generating the segment record comprises:
providing the calculation module with the key value retained in the root segment to call and cause the calculation module to calculate the second RAP identification value, and
generating the segment record by attaching thereto the calculated second RAP identification value.

5. The information processing method according to claim 1, wherein
the generating the segment record comprises: generating the segment record by attaching thereto a key value retained in the root segment, and
wherein the verifying the consistency comprises: before comparing the records, providing the calculation module with the key value included in the segment record to call and cause the calculation module to calculate the second RAP identification value.

6. The information processing method according to claim 1, wherein the verifying the consistency further comprises:
determining that the chain is inconsistent in the case where a contradiction in magnitude relation between the key values is found for the segment record and the first pointer record whose retention address and pointer information coincide with each other; and
determining that the chain is inconsistent in the case where a contradiction in magnitude relation between the key values is found for the segment record and the second pointer record whose retention address and pointer information coincide with each other.

7. A computer program product for verifying a hierarchical database, the computer program product comprising:
a non-transitory computer readable storage device having computer readable program code embodied therewith, the computer readable program code configured to:
in response to reading a root anchor point (RAP) stored in the hierarchical database, generate a first pointer record comprising a first RAP identification value determined from a storage location of the RAP associated with pointer information retained at the RAP point;
in response to reading a root segment in the hierarchical database, generate a segment record and a second pointer record,
wherein the segment record comprises a second RAP identification associated with a retention address of the root segment, the second RAP identification value calculated by a calculation module, the calculation module calculating, for the root segment in the hierarchical database, the second RAP identification value identifying a RAP which points to the root segment,
wherein the second pointer record comprises the second RAP identification value associated with pointer information retained in the root segment pointing to a twin segment thereof; and
verify a consistency of a chain formed in the hierarchical database from the RAP to the root segment by comparing the segment record with the first and second pointer records, further configured to:
determine that the chain is inconsistent in the case where a mismatch between the RAP identification values is found for the segment record and the first pointer record whose retention address and pointer information coincide with each other; and
determine that the chain is inconsistent in the case where a mismatch between the RAP identification values is found for the segment record and the second pointer record whose retention address and pointer information coincide with each other.

8. The computer program product according to claim 7, wherein the computer readable program code configured to generate the segment record is further configured to: attach a key value retained in the root segment to the segment record, and
wherein the computer readable program code configured to generate the second pointer record is further configured to: attach the key value retained in the root segment to the second pointer record.

9. The computer program product according to claim 8, wherein the computer readable program code configured to verify the consistency is further configured to: sort the generated segment records and the generated first and second pointer records, and checking the root segment against the first and second pointer records to detect an inconsistency in the chain.

10. The computer program product according to claim 7, wherein the computer readable program code configured to generate the segment record is further configured to:
provide the calculation module with the key value retained in the root segment to call and cause the calculation module to calculate the second RAP identification value, and
generate the segment record by attaching thereto the calculated second RAP identification value.

11. The computer program product according to claim 7, wherein the computer readable program code configured to generate the segment record is further configured to: generate the segment record by attaching thereto a key value retained in the root segment, and
wherein the computer readable program code configured to verify the consistency is further configured to: before comparing the records, provide the calculation module with the key value included in the segment record to call and cause the calculation module to calculate the second RAP identification value.

12. The computer program product according to claim 7, wherein the computer readable program code configured to verify the consistency is further configured to:
determine that the chain is inconsistent in the case where a contradiction in magnitude relation between the key values is found for the segment record and the first pointer record whose retention address and pointer information coincide with each other; and
determine that the chain is inconsistent in the case where a contradiction in magnitude relation between the key values is found for the segment record and the second pointer record whose retention address and pointer information coincide with each other.

* * * * *